(12) United States Patent
Speeg et al.

(10) Patent No.: US 8,342,851 B1
(45) Date of Patent: Jan. 1, 2013

(54) TISSUE MODEL FOR TESTING BIOPSY NEEDLES

(75) Inventors: Trevor W. V. Speeg, Williamsburg, OH (US); Peter Morgan, Great Shelford (GB)

(73) Assignee: Devicor Medical Products, Inc., Cincinnati, OH (US)

( * ) Notice: Subject to any disclaimer, the term of this patent is extended or adjusted under 35 U.S.C. 154(b) by 527 days.

(21) Appl. No.: 12/533,190

(22) Filed: Jul. 31, 2009

Related U.S. Application Data

(60) Provisional application No. 61/098,320, filed on Sep. 19, 2008.

(51) Int. Cl.
*G09B 23/28* (2006.01)
(52) U.S. Cl. ....................................................... 434/267
(58) Field of Classification Search .................. 434/262, 434/267, 268, 272
See application file for complete search history.

(56) References Cited

U.S. PATENT DOCUMENTS

| | | | |
|---|---|---|---|
| 4,481,001 A * | 11/1984 | Graham et al. ............... | 434/267 |
| 5,526,822 A | 6/1996 | Burbank et al. | |
| 5,649,547 A | 7/1997 | Ritchart et al. | |
| 5,727,948 A * | 3/1998 | Jordan .......................... | 434/267 |
| 5,769,086 A | 6/1998 | Ritchart et al. | |
| 5,775,333 A | 7/1998 | Burbank et al. | |
| 5,850,033 A * | 12/1998 | Mirzeabasov et al. ....... | 73/12.01 |
| 5,928,164 A | 7/1999 | Burbank et al. | |
| 5,964,716 A | 10/1999 | Gregoire et al. | |
| 5,980,469 A | 11/1999 | Burbank et al. | |
| 6,007,497 A | 12/1999 | Huitema | |
| 6,017,316 A | 1/2000 | Ritchart et al. | |
| 6,077,230 A | 6/2000 | Gregoire et al. | |
| 6,086,544 A | 7/2000 | Hibner et al. | |
| 6,120,462 A | 9/2000 | Hibner et al. | |
| 6,228,055 B1 | 5/2001 | Foerster et al. | |
| 6,231,522 B1 | 5/2001 | Voegele et al. | |
| 6,273,862 B1 | 8/2001 | Privitera et al. | |
| 6,468,275 B1 | 10/2002 | Wampler et al. | |
| 6,474,993 B1 * | 11/2002 | Grund et al. .................. | 434/262 |
| 6,780,016 B1 * | 8/2004 | Toly .............................. | 434/262 |
| 7,018,343 B2 | 3/2006 | Plishka | |
| 7,025,732 B2 | 4/2006 | Thompson et al. | |
| 7,419,376 B2 * | 9/2008 | Sarvazyan et al. ........... | 434/273 |
| 7,575,434 B2 * | 8/2009 | Palakodeti .................... | 434/267 |
| 7,876,213 B2 | 1/2011 | Angelo | |
| 7,878,987 B2 | 2/2011 | Hansma et al. | |
| 7,931,471 B2 * | 4/2011 | Senagore et al. ............. | 434/267 |
| 7,966,866 B2 | 6/2011 | Hansma et al. | |
| 2003/0199754 A1 | 10/2003 | Hibner et al. | |
| 2003/0199785 A1 | 10/2003 | Hibner et al. | |

OTHER PUBLICATIONS

CIRS: Tissue Simulation Phantom Technology: Jul. 9, 2008: title "Stereotactic Needle Biopsy Training Phantom", a compressible biopsy training Phantom that won't leak. p. 93 and 94.
CIRS: Tissue Simulation Phantom Technology: Feb. 27, 2009: title "Mammography BR3D Phantom" for Tomosynthesis and Breast CT. p. 91 and 92.
CIRS: Tissue Simulation Phantom Technology: Apr. 22, 2005: title "Tissue-Equivalent Phantom for Mammography". p. 71 and 72.

(Continued)

*Primary Examiner* — Kurt Fernstrom
(74) *Attorney, Agent, or Firm* — Frost Brown Todd LLC

(57) ABSTRACT

A tissue model and test method are described. The tissue model can be used to simulate tissue during design and testing of biopsy needle tip configurations. For instance, the tissue model can be used to estimate the force required to penetrate natural breast tissue with a particular needle tip configuration.

9 Claims, 5 Drawing Sheets

OTHER PUBLICATIONS

Gammex RMI®: titled: "Quality Assurance Products": Internet search Jul. 24, 2009; http://www.gammex.com/n-portfolio/projects.asp?category=Mammography.

Simulab Corporation: title "Complex Tissue Model" Internet search Jul. 24, 2009; http://www.simulab.com.

Magnetic Resonance in Medicine Chapter 53, pp. 372-387, (2005); title Imaging Anisotropic and Viscous Properties of Breast Tissue by Magnetic Resonance-Elastography.

Dynamic Simulator Technical Description, Version 1.1 Gregory J. Gerling et al.; Feb. 2003; Internet search Jul. 24, 2009; http:// University of Iowa.

Joan C. Edwards School of Medicine at Marshall University; Simulator Inventor Catalog 2006.

Int. Worshop on Deformable Modeling and Soft Tissue Simulation; Bonn Germany, Nov. 14 and 15, 200. Title "Truth Cube: Establishing Standards for Real time Soft Tissue Simulation". Kerdok et al.; pp. 1-6.

Complex Tissue Model; Part # TSC-10; by SIMULAB Corporation, 1600 West Armory Way,. Seattle, Washington 98119.

* cited by examiner

TISSUE MODEL FOR TESTING BIOPSY NEEDLES

This application claims priority to provisional application 61/098,320 filed Sep. 19, 2008.

FIELD OF THE INVENTION

The present invention relates in general to a tissue model that can be used to test and design biopsy device needle tips, and to related methods.

BACKGROUND OF THE INVENTION

The diagnosis and treatment of patients with cancerous tumors is an ongoing area of investigation. Medical devices for obtaining tissue samples for subsequent sampling are known in the art. For instance, a biopsy instrument now marketed under the tradename MAMMOTOME is commercially available for use in obtaining breast biopsy samples.

The following patent documents disclose various biopsy devices and are incorporated herein by reference in their entirety: U.S. Pat. No. 7,025,732 issued Apr. 11, 2006; U.S. Pat. No. 6,273,862 issued Aug. 14, 2001; U.S. Pat. No. 6,231,522 issued May 15, 2001; U.S. Pat. No. 6,228,055 issued May 8, 2001; U.S. Pat. No. 6,120,462 issued Sep. 19, 2000; U.S. Pat. No. 6,086,544 issued Jul. 11, 2000; U.S. Pat. No. 6,077,230 issued Jun. 20, 2000; U.S. Pat. No. 6,017,316 issued Jan. 25, 2000; U.S. Pat. No. 6,007,497 issued Dec. 28, 1999; U.S. Pat. No. 5,980,469 issued Nov. 9, 1999; U.S. Pat. No. 5,964,716 issued Oct. 12, 1999; U.S. Pat. No. 5,928,164 issued Jul. 27, 1999; U.S. Pat. No. 5,775,333 issued Jul. 7, 1998; U.S. Pat. No. 5,769,086 issued Jun. 23, 1998; U.S. Pat. No. 5,649,547 issued Jul. 22, 1997; U.S. Pat. No. 5,526,822 issued Jun. 18, 1996; US 2003/0199785 published Oct. 23, 2003; US 2003/0199754 published Oct. 23, 2003; US 2003/0199754 published Oct. 23, 2003.

Biopsy devices may include a cannula having a distal tip, such as a distal tip including a blade. U.S. patent application Ser. No. 12/117,964 filed May 9, 2008, incorporated in its entirety by reference herein, discloses a biopsy device needle tip. The blade of the distal tip is typically used to assist in piercing skin and/or advancing the cannula into a tissue mass, so that a tissue sample may be obtained with the biopsy device. The biopsy device may be a mounted device, such as for stereotactic applications, and include a firing mechanism for directing the distal tip into tissue. Alternatively, the biopsy device may be a handheld device, such as for use with ultrasound, in which case the physician directs the tip of the device into tissue and manipulates the device with a single hand. In either case, it is desirable to reduce the force required to penetrate tissue.

As a result, it can be desirable to test biopsy needle tip designs to determine how those needle tip designs will perform during biopsy procedures. In the past, various substances have been employed to test the effectiveness of needle tip designs. For instance, natural materials, such as pork loin, chicken breast, and turkey breast have been used to evaluate biopsy needle designs. Additionally, various synthetic materials, such as silicone, have been used to test needle tip designs.

Still, scientists and engineers continue to seek materials and methods that can be used to accurately model and test the force required to penetrate breast tissue.

SUMMARY OF THE INVENTION

In one embodiment, the invention provides a tissue model useful in evaluating biopsy needle designs. The tissue model can include a fibrous matrix and a binder. The tissue model can include a layered structure, such as relatively high density layers separated by relatively low density layers.

In another embodiment, the invention provides a method of testing biopsy needle tip designs.

BRIEF DESCRIPTION OF THE DRAWINGS

While the specification concludes with claims particularly pointing out and distinctly claiming the present invention, it is believed the same will be better understood by reference to the following description, taken in conjunction with the accompanying drawings in which:

DETAILED DESCRIPTION OF THE INVENTION

The term "tissue model" as used in this application refers to a substance useful in simulating the characteristics of soft tissue, in particular those tissue characteristics that affect the insertion forces required to introduce a biopsy needle into soft tissue. As used herein, "tissue model" excludes whole tissue samples (such as whole portions of animal tissue) as well as compositions and devices for replacing or augmenting tissue within a living animal, such as implant devices.

Figure 1:
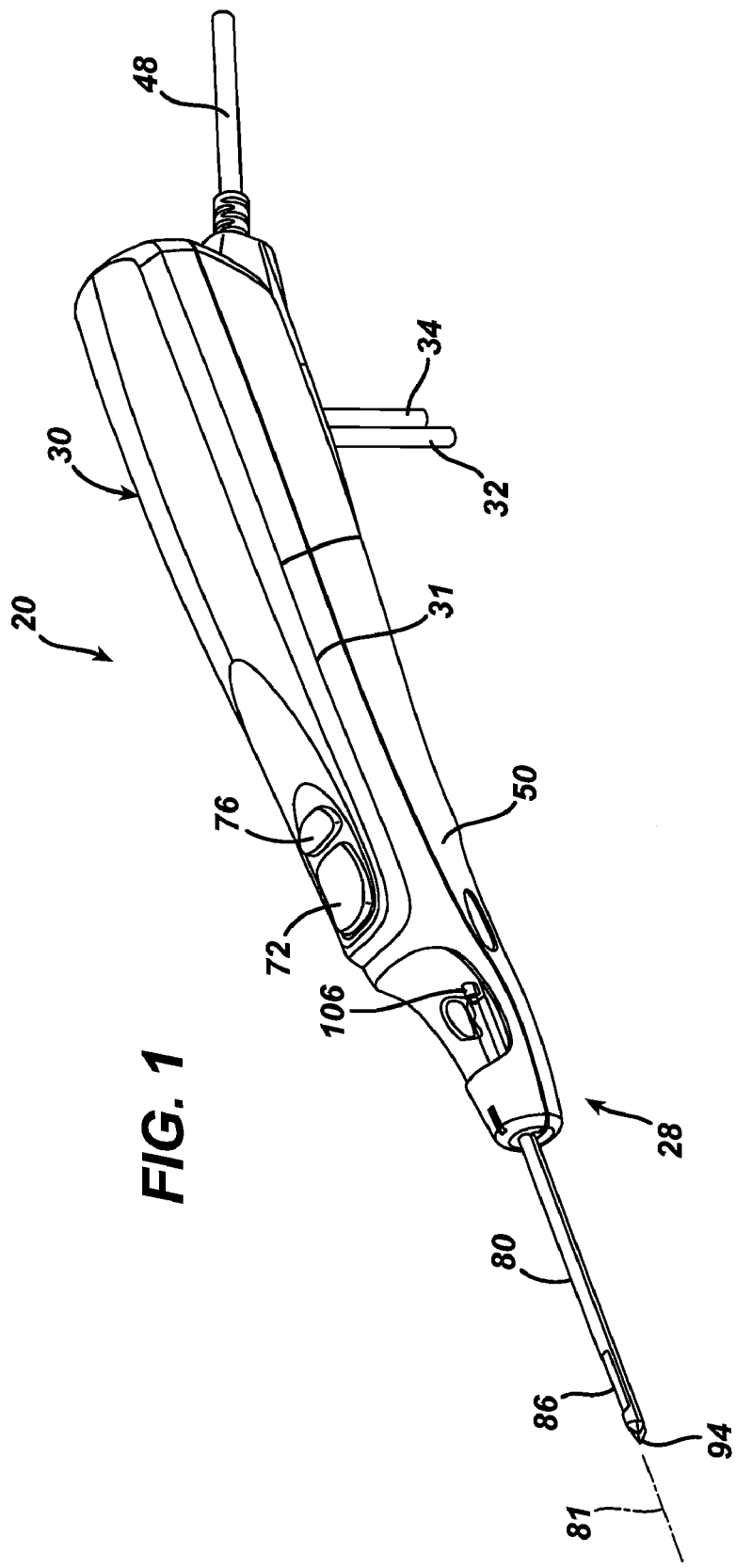
FIG. 1 is schematic illustration of a biopsy device.
Figure 2:
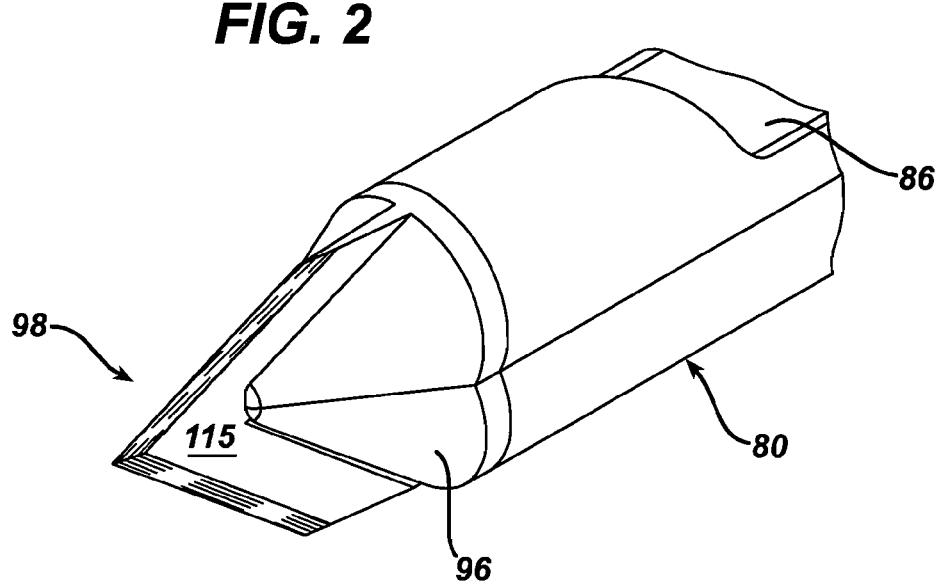
FIG. 2 is a schematic illustration of the distal tip of the biopsy device of FIG. 1.

FIG. 1 and FIG. 2 illustrate a biopsy device comprising a handpiece identified generally by the numeral 20. One such biopsy device is a Mammotome® brand biopsy device marketed by Ethicon Endo-Surgery, Inc. Handpiece 20 is preferably lightweight and ergonomically-shaped to be easily manipulated by an operator's hand.

Handpiece 20 can include a disposable probe assembly 28 and a detachably connected holster 30. Probe assembly 28 can be detachable from holster 30 along interface 31. Probe assembly 28 can be connected to a vacuum system, such as by first vacuum tube 32 and second vacuum tube 34. Holster 30 can include a control cord 48 operationally connecting the handpiece 20 to a control unit and power source.

The probe assembly 28 can include an elongate outer cannula 80 having a side tissue receiving port 86 and a distal tip 94. Distal tip 94 can be a metal injection molded (MIM) component which is attached, such as by welding, gluing, brazing, or other suitable joining methods to the distal end of outer cannula 80. The distal tip 94 can be formed from a metal injection molded component, and can include a generally conical base 96 and a generally flat blade 98 extending distally from the base 96. The blade 98 can have a sharpened leading edge and side walls 115 on each side of the blade 98 (only one side shown in FIG. 2).

During a handheld biopsy procedure, the medical practitioner will exert a force on the device as he/she advances the biopsy needle into the breast. This force will be primarily in the direction of insertion. The force on a biopsy needle will be dependent on the material the needle is inserted into. For a material such as silicone, there will be compressive forces on the needle that may not be present (or at least not present to the same degree) when the same needle is inserted into breast tissue. In addition, some force components on a needle can be interdependent. For example, a high compressive force may lead to a higher friction force. It is possible to characterize the forces acting on a biopsy needle as follows:

Cutting force: the force required to cut a material with a sharp edge, such as the sharp edge of blade 98. This force is different from the friction force acting on the blade as the blade travels through tissue.

Friction Force: The drag force (generally parallel to the long axis of the needle) acting on the tip (e.g. acting on the blade 98 and other portions of tip 94) and the shaft of the needle (e.g. the outer surface of cannula 80).

Hoop Dilation Force: The force (generally radially inwardly on the needle) exerted on the tip and shaft of the needle as the needle is inserted into and expands or dilates the material being biopsied.

Deflection force: The force exerted on the tip by the material as the material is deflected prior to cutting. This force is generally higher for a blunt edge versus a sharp edge.

The tissue model and related methods of the present invention can be useful in comparing various biopsy needle/tip designs. Without being limited by theory, it is believed that the tissue model of the present invention more closely models breast tissue with respect to biopsy needle penetration forces than known tissue models, such as silicone tissue models. In particular, but without being limited by theory, it is believed that the tissue model and related methods of the present invention can be used to more clearly differentiate between certain of the above mentioned force components, such as between the friction force component and the hoop dilation force, as compared to known tissue models, such as silicone tissue models.

Figure 3:
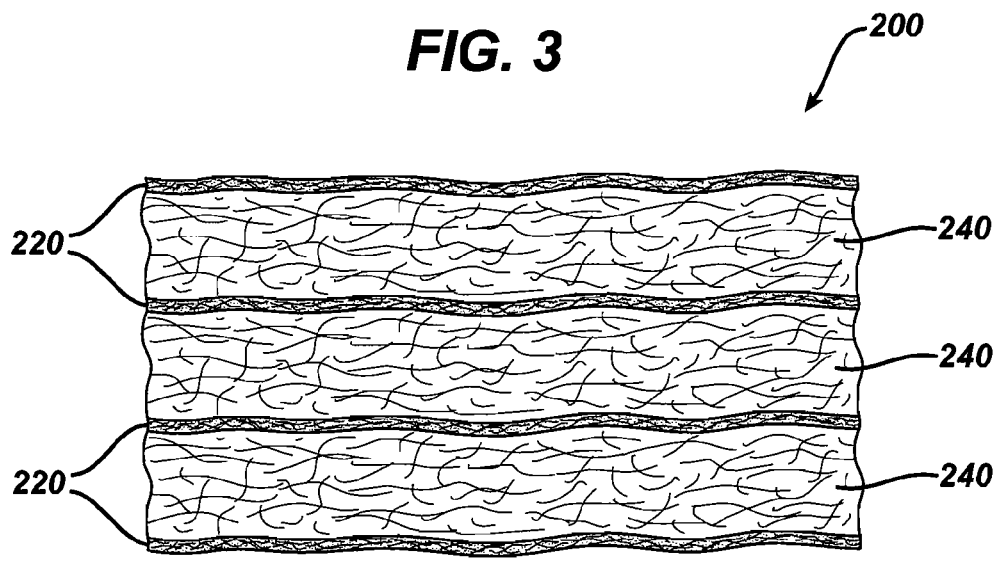
FIG. 3 is a schematic cross-sectional illustration of a sample of a tissue model according to an embodiment of the present invention.

FIG. 3 illustrates a cross-section of a tissue model 200 according to one embodiment of the present invention. The tissue model 200 comprises a fibrous matrix and a binder, as described in more detail below. The fibrous matrix can include natural fibers (e.g. cotton, wool), synthetic fibers (e.g. polyester), and combinations thereof. The binder can be any suitable material for holding the fibrous matrix in a desired configuration. In one embodiment, the binder can comprise a gelatin material, such as beef gelatin.

Referring to FIG. 3, the tissue model 200 can have a layered structure. The tissue model 200 can comprise a plurality of relatively higher density, more compacted fiber matrix regions 220, separated by relatively less dense fibrous matrix regions 240. The relatively higher density regions 220 can comprise compressed cotton pads and gelatin, and the relatively lower density regions can comprise relatively uncompressed polyester fibers, such as 12 ounce weight polyester upholstery wadding, and gelatin.

The tissue model of FIG. 3 can be made according to the following description. Four compressed cotton pads (corresponding to the four regions 220 in FIG. 3) are trimmed to have a diameter of about 95 millimeters. Three pieces of 12 Oz polyester upholstery wadding are cut into cylindrical shapes having a having a diameter of about 95 mm and a thickness of about 4 cm. 280 mL of water is heated to a temperature of 80 degrees centigrade. Powdered beef gelatin is dissolved in the heated water in the amount consistent with the gelatin product package directions. One suitable gelatin is Super Cook brand beef gelatin.

A forming vessel having a volume of approximately ½ liter, such as a round, preferably clear glass or plastic flask having a diameter of about 100 mm to about 120 mm can be used to form the tissue model. One suitable forming vessel is an MCP 0.5 liter Vacuum Casting Cup Liner as described at www.mcp-group.co.uk. The four compressed cotton pads and the polyster wadding are stacked in the forming vessel, starting with a cotton pad on the bottom, and ending with a cotton pad on top, with the pads and wadding being alternated in layers. The forming vessel is placed on a scale, and the dissolved gelatin is slowly poured over the pad and wadding layers until a total weight (not counting the forming vessel) is about 250 grams.

The composition is then compressed in the forming vessel to a height of about 40 mm, such as with a circular weight or piston, or with a beaker containing sufficient weight to maintain the height of about 40 mm. Approximately 400 ml of water can be used to compress the composition. The compressed material is then refrigerated at about 4 degrees centigrade for at least 24 hours before use. The resulting tissue model can be removed from the vessel, and kept refrigerated until required for use.

Without being limited by theory, it is believed that the tissue model 200 having a non-homogeneous composition provides the advantage that it more closely approximates soft tissue in resisting penetration by a biopsy device. For instance, the relatively low density regions 240 may approximate the fatty tissue of the breast, while the relatively high density regions 220 may approximate the Cooper's ligaments structures in the breast, dense breast tissue, or the outer skin layer of the breast.

Figure 4:
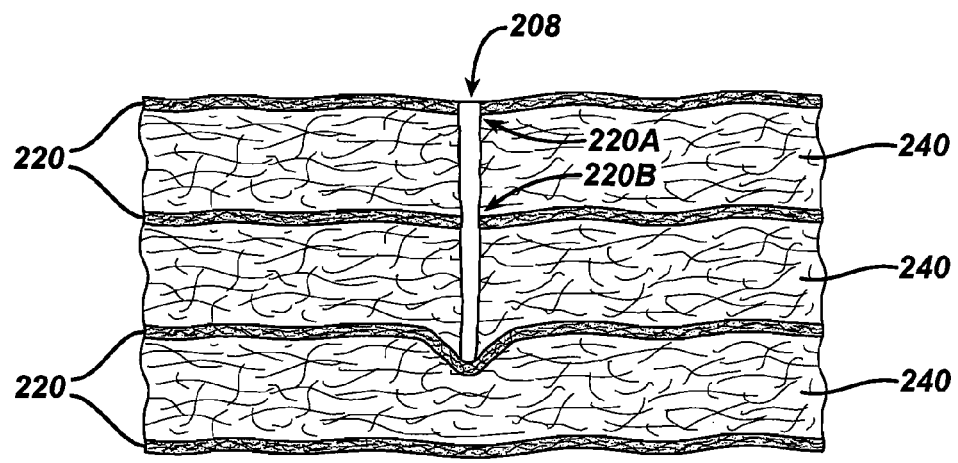
FIG. 4 illustrates a needle penetration path formed in a tissue model of the type shown in FIG. 3 such as could be expected during testing of a needle characterized in having a design that exhibits a relatively low insertion force, the illustrated path depicting one or more relatively high density regions in the tissue model cut or otherwise penetrated by the needle.

Referring to FIG. 4, a schematic illustration of a needle path 208 is shown extending vertically through the layers of the tissue model 200. As illustrated in FIG. 4, the top two layers 220 are illustrated as being cut, or otherwise severed, along the needle path. Such a needle path is illustrative of a path provided by a biopsy needle requiring a relatively low insertion force level.

Figure 5:
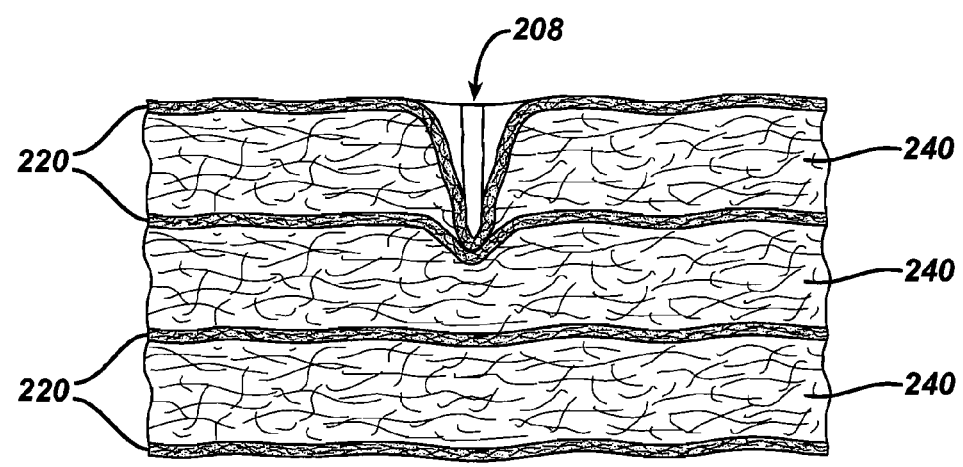
FIG. 5 illustrates a needle penetration path formed in a tissue model of the type shown in FIG. 3 such as could be expected during testing of a needle during testing of a needle characterized in having a design that exhibits a relatively high insertion force, the illustrated path depicting "snow plowing" of the relatively high density regions by the needle.

Referring to FIG. 5, a schematic illustration of a needle path 208 is shown extending vertically into a tissue model 200, where the path 208 does not pass through layers 220, but instead pushes the layers 220, in a "snow plow" fashion. Such a needle path is illustrative of a path provided by a biopsy needle requiring a relatively high insertion force. For instance, a relatively blunt needle knife design, or a dull needle tip might exhibit the path shown in FIG. 5.

The paths 208 in FIGS. 4 and 5 illustrate how employing both relatively high density regions 220 and relatively low density regions 240, such as in a layered configuration, can assist in more accurately modeling the insertion forces experienced in soft tissue. For instance, but without being limited by theory, it is believed that the tissue model 200 can provide the advantage that the insertion force measured in advancing the needle into the model is greater than the force required to retract the needle from the model.

In contrast, various synthetic models, such as silicone models, can have a relatively high frictional force component that is present both in advancing and retracting the needle. This frictional component is a result of the high static and kinetic friction coefficients associated with various synthetic models such as silicone. Accordingly, it can be difficult to "decouple" or differentiate the different forces acting on a needle design when using such models. This can make it difficult to accurately evaluate how a potential needle tip design will perform in soft tissue.

Figure 8:
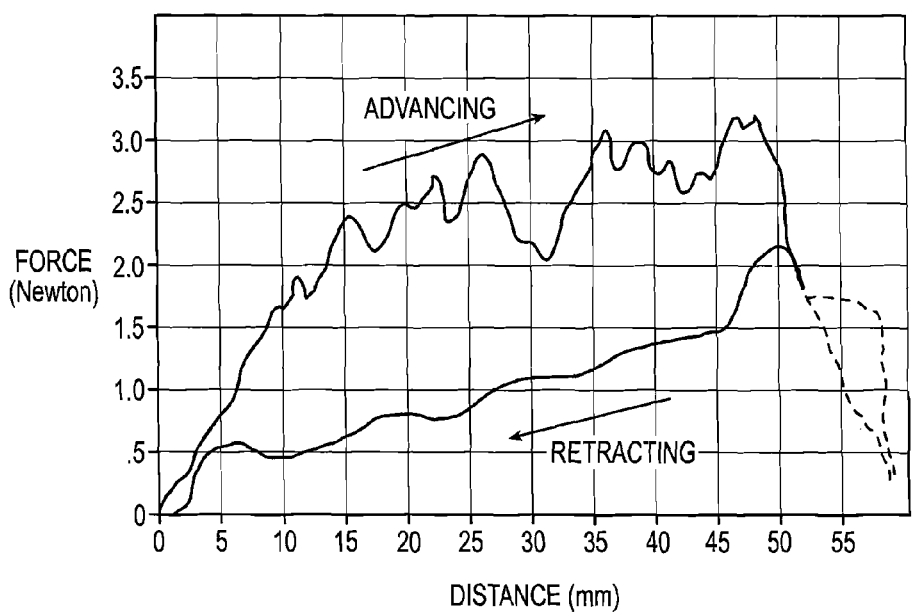
FIG. 8 illustrates a the force of advancing (and retracting) a needle in the tissue model of FIG. 3 can be graphically represented versus distance of advancement.
Figure 9:
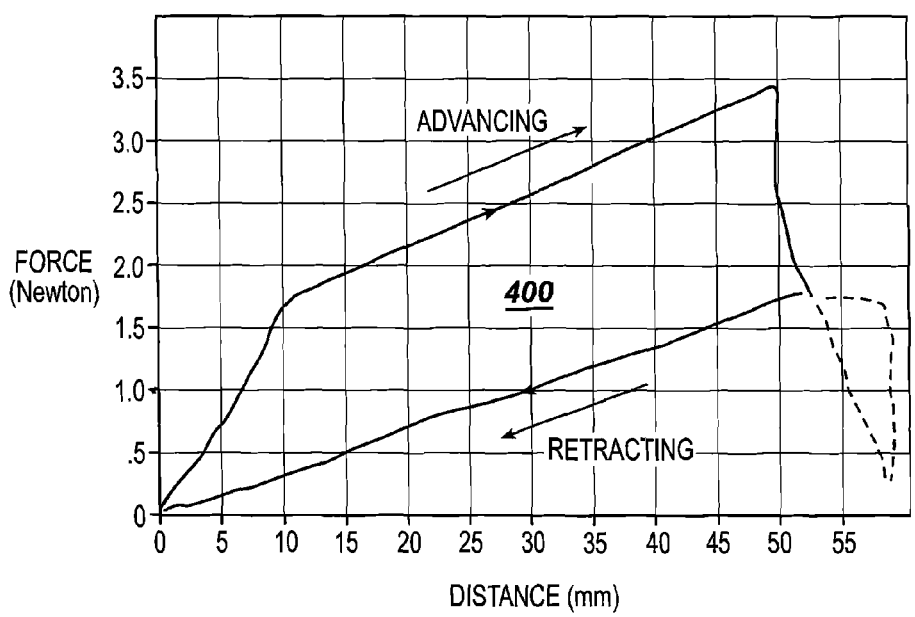
FIG. 9 illustrates how the force displacement data sets obtained from advancing and retracting a needle at multiple locations around the tissue model can be combined to provide a representative curve for advancing (and retracting) a particular biopsy needle being tested.

FIGS. 8 and 9 show the advancing and retracting forces versus distance associated with inserting a needle into a tissue model (such as tissue model 200) having static and kinetic friction coefficients that are similar to human breast tissue. If the friction coefficients of the tissue model are larger than human breast tissue (such as can be the case with silicone based models) then the advancing and retracting curves tend to overlap, or be closely aligned with each other, and the area 400 can be relatively small, or difficult to measure. As a result, testing biopsy needle tip designs with models such as silicone based models may indicate that applying surface treatments or lubricants to the needle cannula 80 will reduce the overall insertion force which can be misleading. While the frictional force component does contribute to the overall insertion force, Applicants have found that the friction force component for at least some silicone tissue models is larger than that of breast tissue, and that the actual contribution of frictional force in breast tissue is relatively small compared to the cutting and hoop dilation force components.

The hoop dilation force component can be reduced by increasing the "length of cut" which can be defined as the perimeter of the cut surface. For example, for a simple slit width W, the cut length would be 2 W. For a cross shaped cut made up of 2 slit widths, W, the cut length would be 4 W. If the cut is made in a material that can only apply a force in tension (e.g. fibrous material) then any cut length less than the perimeter of the needle being pushed through it will result in a hoop stress around the needle. The resulting hoop stress and frictional force act on the needle and increase the overall insertion force. By employing the tissue model of the present invention, Applicants have determined a preferred biopsy needle configuration can be characterized as having the cut length (as measured at a given point along axis 81) to be equal to or slightly greater than the needle tip and cannula perimeter (as measured at the same given point along axis 81), for all points along axis 81. This preferred configuration reduces the insertion force while minimizing the needle tip length or "deadspace". This "deadspace" is the distance from the distal most tip of the needle tip to the distal end of the tissue receiving port 86. It is important to minimize the deadspace to ensure maximum biopsy access close to the chest wall.

Figure 6:
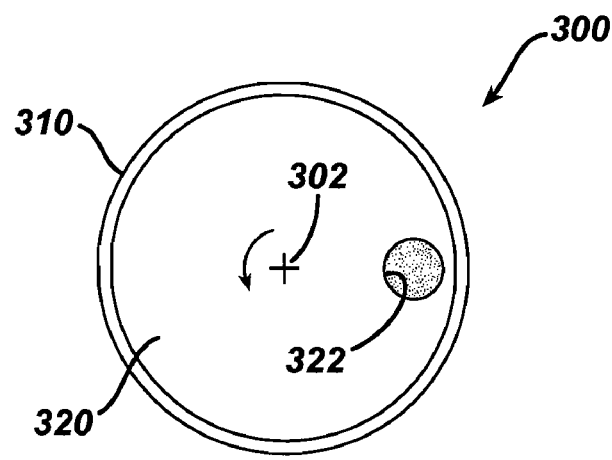
FIG. 6 illustrates a top view of a test apparatus for use in measuring insertion forces using the tissue model of the present invention, the test apparatus containing a rotatable circular top compression plate with an off center hole through which the biopsy needle can be advanced and retracted.
Figure 7:
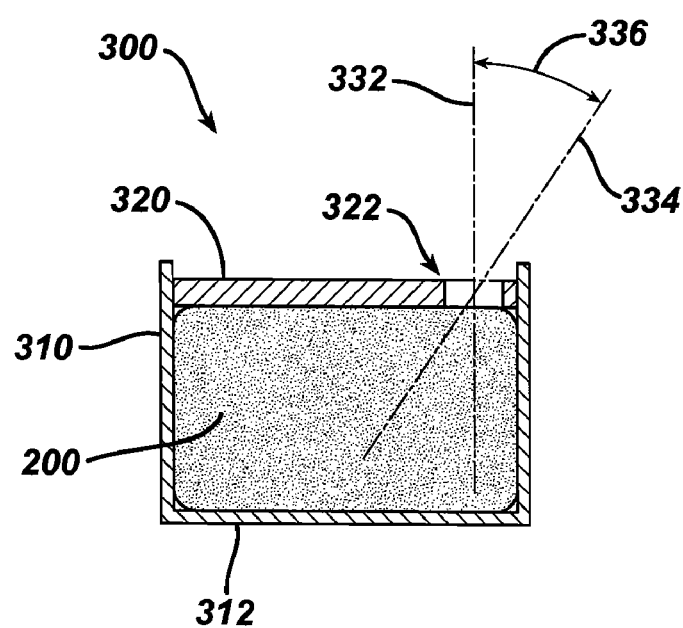
FIG. 7 illustrates a sectional view of the test apparatus of FIG. 6 showing the tissue model compressed under the compression plate and also illustrating a generally vertical needle test path and an inclined needle test path.

FIGS. 6 and 7 illustrate a test apparatus for use in measuring insertion forces using the tissue model of the present invention. FIG. 6 illustrates a top view of the test apparatus 300, which can include a circular top plate 320 a generally cylindrical container 310. FIG. 7 provides a side view cut away to show the container and tissue model 200 in cross-section.

The container 310 can include a bottom floor plate 312. The tissue model 200 can be compressed between plate 320 and plate 312. Then, with the model 200 compressed, the needle being tested can be advanced through opening 322, and then retracted. The force to advance and retract the needle can be measured as a function of distance. The force-distance measurements can be made both vertically (e.g. Along axis 332 in FIG. 7) and along an inclined axis (e.g. along axis 334), where the angle 336 can be about 45 degrees. The measurements can be made at multiple locations in the tissue model 200 by rotating the plate 320 to reposition the opening 322 at a new location, and repeating the advancement and retraction of the needle being tested.

Compressing the tissue model between two surfaces can be desirable because a patient's breast tissue is normally compressed in certain breast biopsy techniques employing compression paddles or plates for use with x-ray and MRI imaging. An MST Instron test machine can be used to hold the needle and advance the needle into and out of the tissue model. A small Jacob's chuck and a 201b load cell can be employed. The needle axial motion (motion parallel to axis 81 in FIG. 1) can be controlled using software compatible with Instron test machines, such as TestWorks software with a basic compression method at a sampling rate of 20 in/min and an extension limit of 2.2 in.

By way of illustration, FIG. 8 shows how the force of advancing (and retracting) the needle can be graphically represented versus distance of advancement (and retraction). FIG. 9 illustrates how the force displacement data sets obtained from advancing and retracting a needle at multiple locations around the tissue model (as explained above) can be combined to provide a representative curve for advancing and retracting a particular needle being tested.

Referring to FIG. 9, the area 400 between the portion of the curve associated with advancing a needle and the portion of the curve associated with retracting the needle can be determined by any suitable method. The representative curves and area 400 can be useful in separating (or isolating) the contribution of friction force from the contribution of cutting and dilation forces encountered with a particular needle design.

Without being limited by theory, it is believed that one advantage of the tissue model of the present invention over various silicone based models is that the tissue model of present invention more accurately mimics the difference between the force to advance and the force to retract a given biopsy needle in soft tissue. In particular, known silicone based models tend to have exert a relatively large friction force component both on advancing and retracting a given biopsy needle. As a result, it can be difficult to determine how changes in biopsy needle tip design impact other force components when using such silicone models.

In one aspect of the present invention, the tissue model can be used to evaluated different needle tip designs. For instance, the tissue model can be used to evaluate various dimension and/or dimensional relations of biopsy needles to reduce the force required to penetrate tissue.

While embodiment of the present invention have been shown and described herein, those skilled in the art will recognize that such embodiments are provided by way of example, and that numerous variations, changes, and substitutions will now occur to those skilled in the art without departing from the spirit and scope of the present invention. Further, each element disclosed may be alternatively described as a means for performing the element's function.

What is claimed is:

1. A tissue model kit for use in testing biopsy devices forces, the tissue model kit comprising:
   a tissue model, comprising:
      a fibrous matrix; and
      a binder, wherein the tissue model does not comprise silicone; and
   a force testing apparatus, comprising:
      a cylindrical sidewall,
      a first plate, wherein the first plate comprises a first, solid portion and a second portion, wherein the second portion comprises an annular wall defining an aperture, wherein the aperture is disposed within a perimeter of the first, solid portion and off-center from a center of the first plate, and wherein the aperture is configured to receive a biopsy needle;
      a second plate comprising a solid portion, wherein the second plate is disposed below the first plate and spaced from the first plate via the cylindrical sidewall, and wherein the tissue model is configured to be compressed between the first plate and the second plate.

2. The tissue model kit of claim 1,
   wherein the tissue model comprises a plurality of relatively higher density regions and a plurality of lower density regions; and
   wherein the relatively high density regions and the relatively low density regions alternate in layers extending generally across a path of direction of insertion of the biopsy needle.

3. The tissue model of claim 1, further comprising a load cell, wherein the load cell is operable to measure advancement and retraction forces of a needle inserted in the tissue model.

4. The tissue model of claim 3, further comprising a software application, wherein the load cell is in communication with the software application, wherein the software application is operable to display graphical representations of the measured advancement and retraction forces.

5. The tissue model of claim 1, wherein the aperture is rotatable about the center of the first plate.

6. The tissue model of claim 1, wherein the needle is configured for at least one of automatic advancement or retraction into the compressed tissue model along one of a first path or a second path, wherein the first path is substantially perpendicular to a longitudinal axis of the first plate, and wherein the second path is angled with respect to the first path.

7. The tissue model of claim 6, wherein the second path is angled about 45 degrees with respect to the first path.

8. The tissue model of claim 2, wherein at least one low density region comprises relatively uncompressed polyester fibers and gelatin.

9. The tissue model of claim 8, wherein at least one higher density region comprises compressed cotton pads and gelatin.

* * * * *

UNITED STATES PATENT AND TRADEMARK OFFICE
CERTIFICATE OF CORRECTION

PATENT NO. : 8,342,851 B1
APPLICATION NO. : 12/533190
DATED : January 1, 2013
INVENTOR(S) : Trevor W. V. Speeg and Peter Morgan It is certified that error appears in the above-identified patent and that said Letters Patent is hereby corrected as shown below:

Col. 8, Claim 3, line 1, reads "...The tissue model of..."; which should be deleted and replaced with "...The tissue model kit of...."

Col. 8, Claim 4, line 5, reads "...The tissue model of..."; which should be deleted and replaced with "...The tissue model kit of...."

Col. 8, Claim 5, line 10, reads "...The tissue model of..."; which should be deleted and replaced with "...The tissue model kit of...."

Col. 8, Claim 6, line 12, reads "...The tissue model of..."; which should be deleted and replaced with "...The tissue model kit of...."

Col. 8, Claim 7, line 19, reads "...The tissue model of..."; which should be deleted and replaced with "...The tissue model kit of...."

Col. 8, Claim 8, line 21, reads "...The tissue model of..."; which should be deleted and replaced with "...The tissue model kit of...."

Col. 8, Claim 9, line 24, reads "...The tissue model of..."; which should be deleted and replaced with "...The tissue model kit of...."

Signed and Sealed this
Fifth Day of March, 2013

Teresa Stanek Rea
*Acting Director of the United States Patent and Trademark Office*